D. LAZARUS.
ADJUSTABLE RIM.
APPLICATION FILED MAY 28, 1920.
1,374,930.
Patented Apr. 19, 1921.
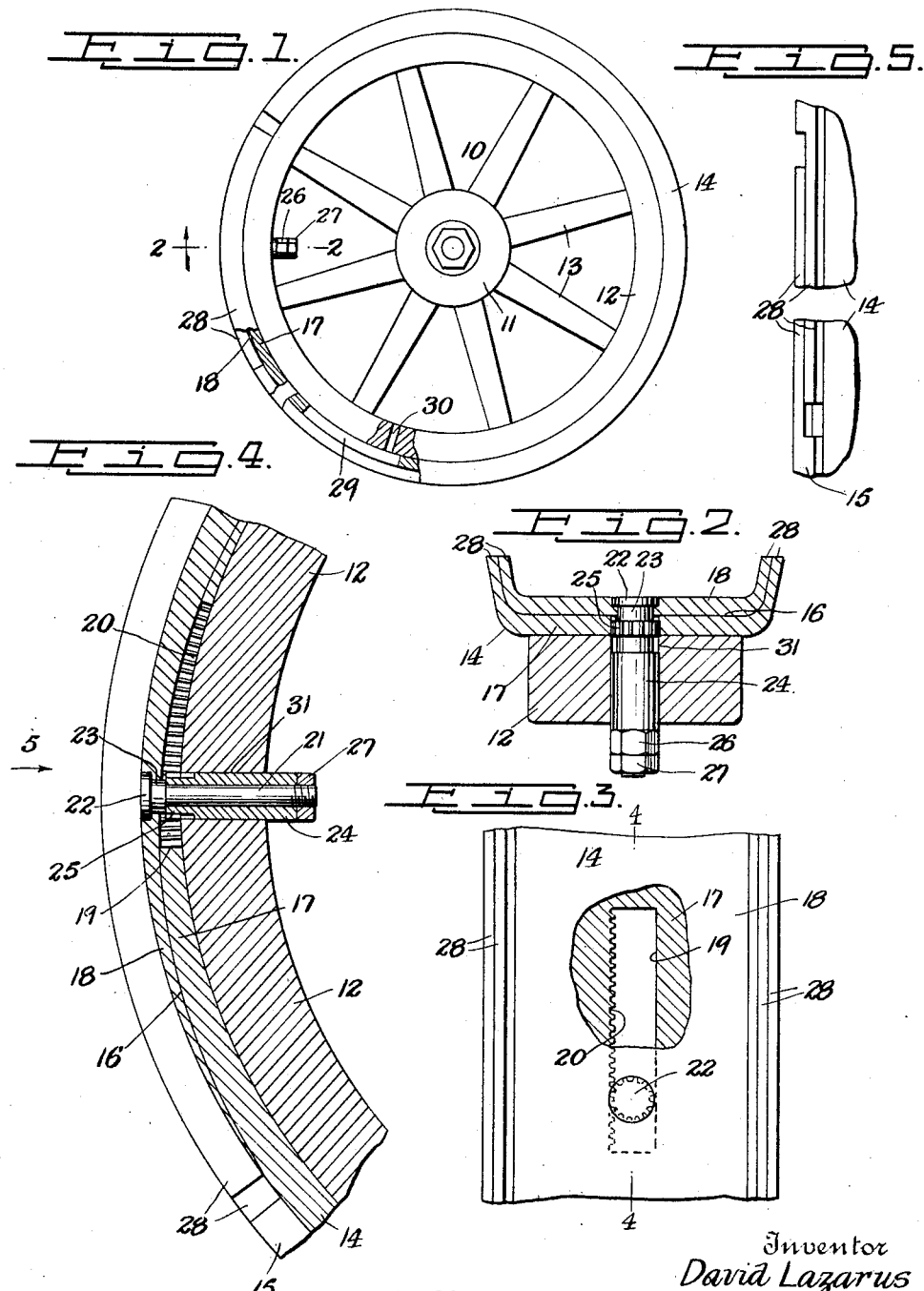
Inventor
David Lazarus
By his Attorneys
Edgar Tate & Co.

UNITED STATES PATENT OFFICE.

DAVID LAZARUS, OF NEW YORK, N. Y.

ADJUSTABLE RIM.

1,374,930.

Specification of Letters Patent.  Patented Apr. 19, 1921.

Application filed May 28, 1920. Serial No. 384,873.

*To all whom it may concern:*

Be it known that I, DAVID LAZARUS, a citizen of the United States, and residing at New York, in the county of New York and State of New York, have invented certain new and useful Improvements in Adjustable Rims, of which the following is a specification, such as will enable those skilled in the art to which it appertains to make and use the same.

This invention relates to adjustable rims and particularly to devices of this class designed for use in connection with the wheels of motor vehicles and which serve to support the pneumatic tires in connection with such wheels, and the object of the invention is to provide a rim of the class and for the purpose specified with means whereby the same may be adjusted into different sizes to adapt said rim for use in connection with wheels of different sizes; a further object being to provide an adjustable rim of the class specified which by reason of its adjustable feature may be readily applied to and removed from the wheel of a motor vehicle and applied to and removed from a pneumatic tire; and with these and other objects in view the invention consists in a device of the class and for the purpose specified which is simple in construction and operation and efficient in use and which is constructed and operated, as hereinafter described and claimed.

The invention is fully disclosed in the following specification, of which the accompanying drawing forms a part, in which the separate parts of my improvement are designated by suitable reference characters in each of the views, and in which:—

Figure 1 is a diagrammatic side view of a wheel of a motor vehicle showing my improved rim mounted in connection therewith;

Fig. 2 a partial section on the line 2—2 of Fig. 1 and on an enlarged scale;

Fig. 3 a plan view of the construction shown in Fig. 2 with part of the construction broken away and in section;

Fig. 4 a partial section on the line 4—4 of Fig. 3; and,

Fig. 5 a detail view of the rim looking in the direction of the arrow 5 of Fig. 4 with part of the construction broken away.

In the drawing I have shown at 10 a wheel of a motor vehicle, said wheel comprising a hub portion 11, a rim or felly portion 12 and spokes 13 and, in the practice of my invention, I provide a rim 14, preferably composed of sheet metal, and the side edge portions of which are bent outwardly to form side flanges 15. The rim 14 is annular in form and a predetermined portion thereof is split or sub-divided as shown at 16 to form arc-shaped and tapered inner and outer end portions 17 and 18, which overlap each other and one of which is adapted to move longitudinally of the other. The inner end portion 17 of the rim is provided with an elongated aperture 19, one side wall of which is provided with a rack construction 20, as clearly shown in Figs. 3 and 4 of the drawing. A bolt 21 is mounted in the outer end portion 18 of the rim, the head 22 of said bolt being countersunk in said end portion and provided inwardly of said head with a neck portion 23, which is of a greater diameter than the bolt 21. A sleeve 24 is rotatably mounted on the bolt the inner end of said sleeve being provided with a gear 25 which meshes with the rack 20 and at its outer end with a hexagon head 26, which facilitates the rotation of said sleeve. A lock nut 27 is mounted on the threaded end portion of the bolt 21 and serves to move the sleeve 24 inwardly against the neck portion 23 of the bolt to hold said sleeve against rotation.

The flanges 15 of the rim 14 on the end portions 17 and 18 of said rim are split to form overlapping flanges 28, as clearly shown in Figs. 3 and 5 of the drawing to provide a guide and support for a pneumatic tire mounted on the rim and at the same time permit of the adjustment of the end portions 17 and 18 one upon the other as hereinafter described.

The rim 14 is also provided adjacent to the split portion 16 thereof with an elongated aperture 29, which is adapted to register with the usual valve receiving aperture 30 in the felly 12 of the wheel, whereby in the different positions of adjustment of the rim 14 the aperture 29 will register with the aperture 30 in the felly. The felly 12 is also provided with another aperture 31 adapted to receive the bolt 21 and sleeve 24, as clearly shown in Fig. 4 of the drawing.

In the use of my improved rim and when it is desired to mount said rim on a wheel of predetermined dimensions, the rim 14 is adjusted to the desired size, or to a size slightly greater than that of the wheel or the felly portion thereof by the rotation of the sleeve 24, and when said rim is locked in the desired position of adjustment by the lock nut 27, the rim may be readily applied to the wheel in the usual manner, it being understood that in this operation the bolt 21 with the sleeve 24 thereon is passed through the aperture 31 and the valve of the pneumatic tire is passed through the aperture 30 in the felly in the same operation, and after the rim has been placed in proper position on the wheel, the nut 27 may be loosened and the sleeve 24 operated to securely clamp the rim 14 on the wheel, after which the sleeve 24 is again locked in position by the nut 27.

By providing an adjustable rim of the class specified, I also facilitate the placement of the pneumatic tire on the rim 14 in that the rim may be adjusted to a smaller diameter than that of the pneumatic tire to facilitate the placement of the tire on the rim as well as the removal of the tire from said rim.

It will also be apparent that my improved rim may be made up in two or three different sizes to provide adjustable rims that will take care of the different size wheels in use and, in this event, any one size of rim will be capable of a two or three inch adjustment, or may be enlarged in diameter to the extent of two or three inches as may be desired.

In the accompanying drawing I have shown the rim in its normal position and in the adjustment of said rim to increase the diameter thereof, the end portion 17 of the rim is moved longitudinally of the end portion 18 thereof by the rotation of the sleeve 24, and by reason of the split in the rim and the length of the tapered end portions 17 and 18 an adjustment of two or three inches on a rim of definite size will form but a slight depression on the outer face of the rim 14, and this depression will not affect the use of a pneumatic tire thereon or cause any trouble such as the pinching of an inner tube. It will be apparent that in the accompanying drawing the various sizes and dimensions of the rim 14 have been exaggerated to a great extent merely for the purpose of illustrating the invention, but in actual practice the rim 14 will be constructed of the required dimensions to provide ample strength to the rim and permit of the adjustment of the free end portions thereof, as hereinbefore described.

While I have described my invention as an adjustable rim for the wheels of motor vehicles, it will be understood that I am not necessarily limited to this use as the same may be used in connection with any annular member or band where an adjustment is desirable, or where it is desired to increase or decrease the diameter of an annular member or band, and while I have shown certain details of construction for carrying my invention into effect, I am not necessarily limited to these details, and various changes therein and modifications thereof may be made, within the scope of the appended claims, without departing from the spirit of my invention or sacrificing its advantages.

Having fully described my invention, what I claim as new and desire to secure by Letters Patent, is:—

1. An adjustable rim of the class described, said rim being split to form overlapping and tapered end portions, one of said end portions being provided with an elongated aperture, a rack construction in one side wall of said aperture, and a gear device carried by the other end portion of the rim and adapted to coöperate with said rack construction to adjust said first named end portion of the rim longitudinally of the last named end portion.

2. An adjustable rim of the class described, said rim being split to form overlapping and tapered end portions, one of said end portions being provided with an elongated aperture, a rack construction in one side wall of said aperture, a gear device carried by the other end portion of the rim and adapted to coöperate with said rack construction to adjust said first named end portion of the rim longitudinally of the last named end portion, and means for locking said gear device in different positions of adjustment.

3. An adjustable rim of the class described, said rim being split to form overlapping and tapered end portions, one of said end portions being provided with an elongated aperture, a rack construction in one side wall of said aperture, a bolt carried by the other end portion of the rim and adapted to pass through said elongated aperture, a sleeve rotatably mounted on said bolt, a gear on said sleeve adapted to operate in connection with the rack construction in said elongated aperture whereby the rotation of said sleeve will move the first named end portion of the rim longitudinally of the last named end portion, and means on said bolt for locking said sleeve and gear against movement.

4. An adjustable rim or band member of the class described provided with side flanges and with overlapping end portions, one of said end portions being provided with a rack, and a gear device carried by the other end portion and adapted to coöperate with said rack to adjust said first named end portion longitudinally of said last named end portion.

5. An adjustable rim of the class described, said rim being split transversely to form overlapping and longitudinally tapered end portions, and means on the separate end portions and coöperating with each other for adjusting one of said end portions longitudinally of the other.

In testimony that I claim the foregoing as my invention I have signed my name in presence of the subscribing witnesses this 25th day of May, 1920.

DAVID LAZARUS.

Witnesses:
C. E. MULREANY,
H. E. THOMPSON.